July 1, 1930.  A. E. HUTT  1,769,027
SEMIDOUBLE DECK PASSENGER CARRYING VEHICLE
Filed Feb. 8, 1928  2 Sheets-Sheet 1
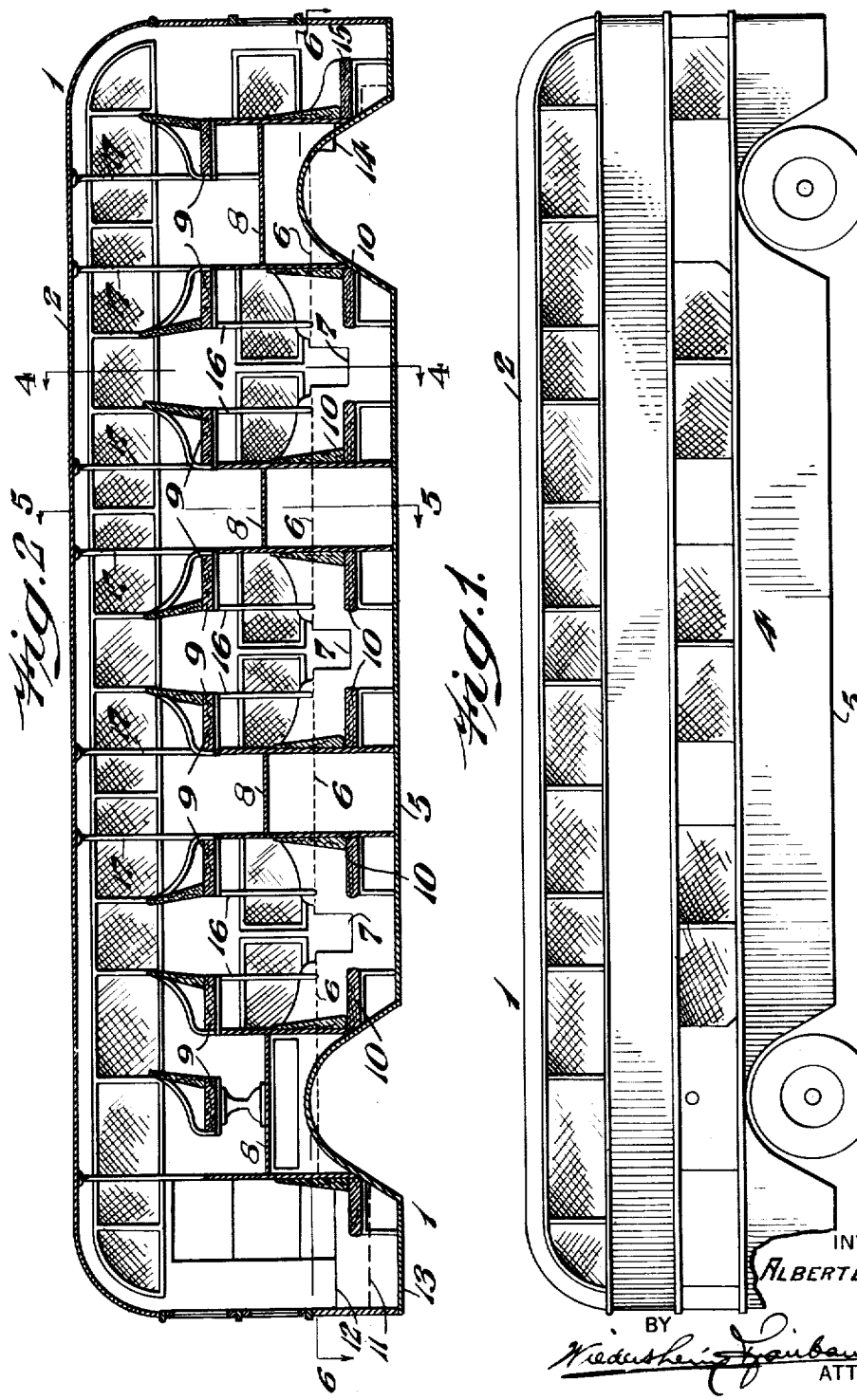
INVENTOR:
ALBERT E. HUTT,
BY
ATTORNEYS.

July 1, 1930.  A. E. HUTT  1,769,027
SEMIDOUBLE DECK PASSENGER CARRYING VEHICLE
Filed Feb. 8, 1928  2 Sheets-Sheet 2
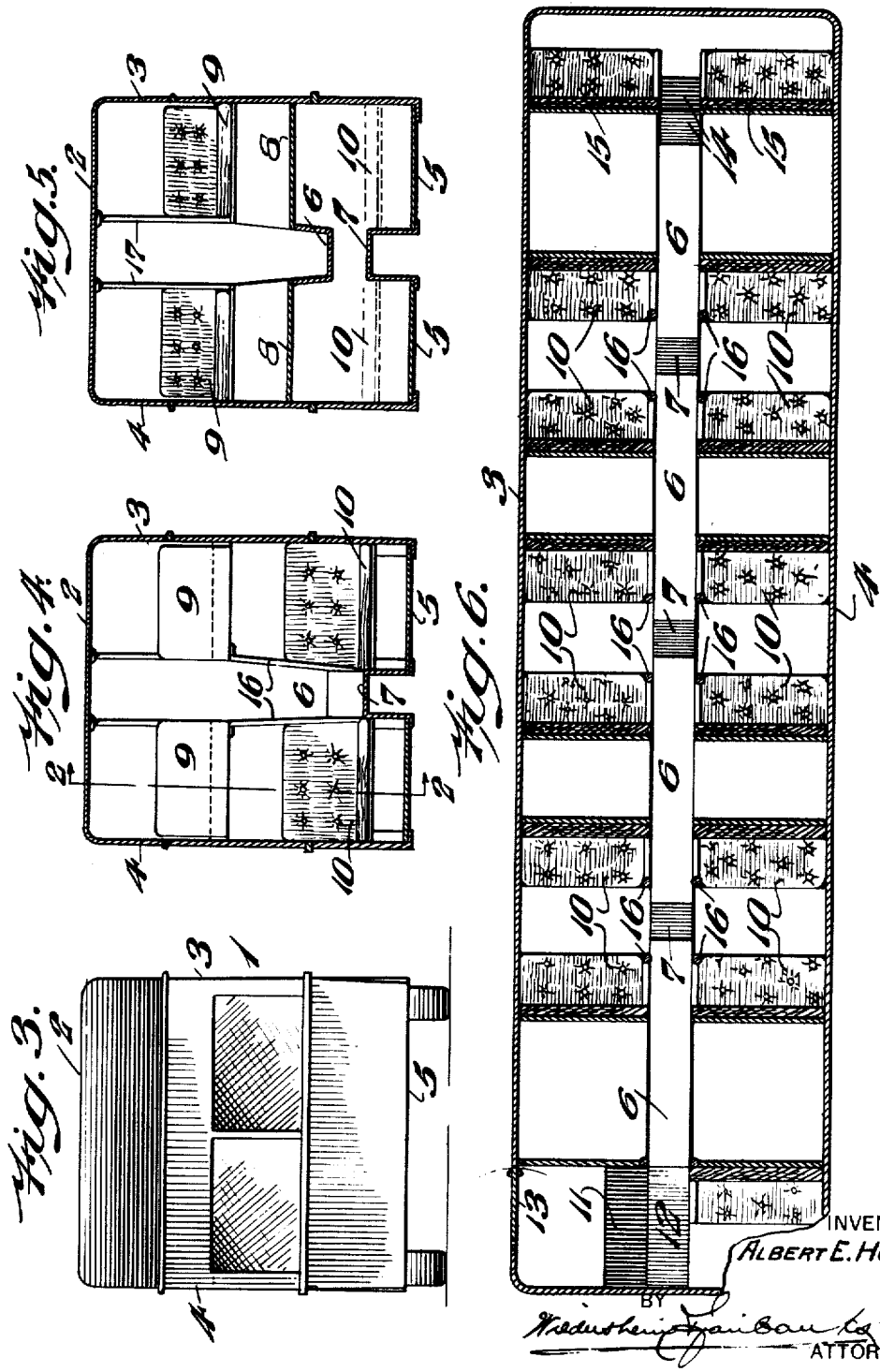
INVENTOR:
ALBERT E. HUTT,
BY
ATTORNEYS.

Patented July 1, 1930

1,769,027

UNITED STATES PATENT OFFICE

ALBERT E. HUTT, OF NEW ROCHELLE, NEW YORK

SEMIDOUBLE-DECK PASSENGER-CARRYING VEHICLE

Application filed February 8, 1928. Serial No. 252,748.

My invention relates to a novel semi-double deck passenger carrying vehicle which is capable of accommodating a maximum number of seated passengers for a minimum of volumetric capacity and which does away with the present necessity of compelling passengers to stand in order to accommodate sufficient passengers for profitable operation.

My invention further relates to a novel construction which is equally applicable to all kinds of passenger carrying vehicles such as motor coaches, street cars and railroad carriages where a maximum seating capacity is desired.

My invention relates more particularly to a novel arrangement of seats located in two planes, the seats on the upper plane being positioned above those in the lower plane but facing in the opposite direction so as to reduce to a minimum the distance between said upper and lower seats thereby producing a "double deck" vehicle of a minimum overall height.

My invention further relates to a novel arrangement of upper and lower seats without the need of upper and lower aisles or passageways and without the need of a stairway to reach the upper aisle and seats from the lower portion or floor of the vehicle, such as is used at present on double deck motor vehicles.

My invention further relates to a novel construction wherein a single aisle positioned intermediately of the upper and lower seats serves both said upper and lower seats and which is so disposed that both the upper and lower seats can readily be reached from it.

My invention further relates to a novel vehicle that can be built very near to the ground and still leave adequate clearance for the transmission of power from the power plants to the rear wheels due to the aisle being located as stated in a higher plane than the floor of the lower passenger carrying compartment.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings:—

Figure 1, represents a side elevation of my novel passenger vehicle, as applied to a motor coach.

Figure 2, represents a sectional view on line 2—2 of Fig. 4.

Figure 3, represents a rear view of Fig. 1.

Figure 4, represents a sectional view on line 4—4 of Fig. 2.

Figure 5, represents a sectional view on line 5—5 of Fig. 2.

Figure 6, represents a sectional view on line 6—6 of Fig. 2.

Similar reference numerals designate similar parts.

1 represents my novel passenger carrying vehicle, such as a motor coach having the roof 2, the sides 3, and 4, the bottom floor 5 and the longitudinal aisle or passageway 6, which is provided with suitably spaced steps 7 leading to the lower seats 10 arranged on either side of and below said aisle in pairs facing each other. A series of suitably spaced steps 8 lead from said aisle 6 to the upper seats 9 arranged on either side of said aisle and directly above and in vertical alignment with the lower seats 10, 11 and 12 designate front steps leading from the vehicle front platform 13 to the aisle 6, while the rear step 14 leads from the rear end of the aisle 6 to the lower rear observation seats 15. 16 represents stanchions which serve for supporting the upper seats 9 and as grab handles for passengers entering and leaving the lower seats 10. The upper seats 9 are similarly provided with the upper stanchions 17 serving as grab handles for the passengers using said seats.

It will readily be seen from the above description that a passenger walking along the aisle 6 can with equal ease reach either an upper or a lower seat according to his preference or to whatever seats are available.

It will be noticed that I have shown the aisle positioned nearer to the floor of the upper compartment and that I have placed gaps 7 in this aisle to make steps to the lower compartments or seats. This necessitates passengers stepping over these gaps when walking along the aisle. These gaps, however, need only be twelve inches wide or even less and may be illuminated with safety lights so that obviously they will not be accident hazards. It should be noticed however, that I can just as well locate the aisle in another position relative to the upper and lower compartments and can either place gaps in it or make it continuous whichever construction is best suited for the particular vehicle to be built, so that my invention is obviously not limited to the particular construction shown herewith.

While the vehicle typified in the drawings is a motor coach, the power plant, transmission, steering and other mechanisms have not been shown as they do not form parts of the invention which is directed mainly to the passenger seating arrangement of the vehicle.

It will be further apparent that the seating arrangement described herein can be applied with equal facility to electric street cars and also to steam and electric railroad carriages and the like, and in fact to a passenger carrying vehicle of any character.

It will be seen that when a passenger enters the vehicle by the conventional entrance door on the right sides of the vehicle, that he mounts the front steps 11 and 12 which lead to the aisle 6 from which he can reach any of the upper seats 9 by mounting a step 8 or any of the lower seats 10 by descending a step 7. Should he wish to take a seat in the rear observation compartment he would use the steps 14 at the rear end of the aisle 6. As the distance between the floors of the upper and lower compartment need only be approximately three feet, the aisle 6 could be located midway between them, in which case a passenger need only take either one step up or one step down to reach either an upper or lower seat and there would be no need for any gaps in the aisle.

The compactness of a vehicle of this design will be readily apparent since the overall height need not exceed 8 feet, nine inches, which is the present height of many single deck busses. This low overall height greatly aids to the stability of the vehicle and results in a much safer operation at higher speed by reason of a lower center of gravity than is now possible, all of which opens up a wider field for double deck vehicles than has existed up to the present time.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. In a passenger carrying vehicle, a body, a single longitudinal aisle therein, seats on two levels, above and below said aisle, the upper seats being positioned above the lower seats and in vertical alignment therewith, and steps accessible from said single aisle to reach either said upper or lower seats therefrom.

2. In a passenger carrying vehicle, a body, a single longitudinal aisle therein, seats on two levels on each side of and above and below said aisle, the upper seats being positioned above the lower seats, said aisle being intermediate said upper and lower seats and in vertical alignment therewith and steps accessible from said aisle to reach either the upper or lower seats therefrom.

3. In a passenger carrying vehicle, a body, a single longitudinal aisle therein, seats on two levels positioned transversely of said aisle, and facing in two opposite directions on each level, and in vertical alignment with each other, and steps to reach both upper and lower seats from said aisle, said aisle being positioned in a plane between the upper and lower seats.

4. In a passenger carrying vehicle, a body, a single central longitudinal aisle therein, seats on two levels set transversely of and on both sides of said central aisle, said seats facing in opposite directions on both levels, and being in vertical alignment with each other, and steps to reach both upper and lower seats from said aisle, said aisle being positioned in a plane between the upper and lower seats.

5. In a passenger carrying vehicle, a body, a series of transversely arranged lower seats positioned therein in pairs facing each other, a series of transversely arranged upper seats also positioned in pairs facing each other, a single longitudinal aisle intermediate of said upper and lower seats, lower steps leading from said aisle and arranged intermediately of each pair of lower seats, and upper steps also leading from said aisle and arranged intermediately of each pair of upper seats.

6. In a passenger carrying vehicle, a body, a series of transversely arranged lower seats positioned therein in pairs facing each other, a series of transversely arranged upper seats also positioned in pairs facing each other, a single longitudinal aisle intermediate of said upper and lower seats, lower steps leading from said aisle and arranged intermediately of each pair of lower seats, and upper steps also leading from said aisle and arranged intermediately of each pair of upper seats, the forwardly facing lower seats being in vertical alignment with the rearwardly facing upper seats.

7. In a passenger carrying vehicle, a body, a top, floor, and sides therefor, a longitudinal aisle positioned nearer to said floor than to said top, a series of transversely arranged lower seats on each side of said aisle, steps leading downwardly from said aisle to said lower seats, a series of transversely arranged upper seats, positioned on each side of said aisle, and steps leading upwardly from said aisle to said upper seats, said upper and lower seats being in vertical alignment, with a forwardly facing upper seat being above a rearwardly facing lower seat, and a rearwardly facing upper seat being above a forwardly facing lower seat.

8. In a passenger carrying vehicle, a body, a top, floor, and sides therefor, a longitudinal aisle positioned nearer to said floor than to said top, a series of transversely arranged lower seats on each side of said aisle, steps leading downwardly from said aisle to said lower seats, a series of transversely arranged upper seats, positioned on each side of said aisle, and steps leading upwardly from said aisle to said upper seats, said upper and lower seats being in vertical alignment with a forwardly facing upper seat being above a rearwardly facing lower seat, and a rearwardly facing upper seat being above a forwardly facing lower seat in combination with lower stanchions extending from said lower seats to said upper seats and upper stanchions extending from said upper seats to said top.

9. In a passenger carrying vehicle, seats on two levels within said vehicle, seats facing forwardly and rearwardly on both levels, the upper seats being in vertical alignment with the lower seats, the forwardly facing seats on the upper level being in vertical alignment with the rearwardly facing seats on the lower level, the rearwardly facing seats on the upper level being in vertical alignment with the forwardly facing seats on the lower level, there being spaces between the backs of back-to-back upper seats to afford headroom for lower seat passengers when standing between the lower seats, there being spaces between the backs of back-to-back lower seats to afford foot room for the upper seat passengers below the heads of the lower seat passengers, and a longitudinal aisle from which either upper or lower seats may be reached by one or more steps.

10. In a passenger carrying vehicle, seats on two levels within said vehicle, seats facing forwardly and rearwardly on both levels, the upper seats being in vertical alignment with the lower seats, the forwardly facing seats on the upper level being in vertical alignment with the rearwardly facing seats on the lower level, the rearwardly facing seats on the upper level being in vertical alignment with the forwardly facing seats on the lower level, there being spaces between the backs of back-to-back upper seats to afford headroom for lower seat passengers when standing between the lower seats, there being spaces between the backs of back-to-back lower seats to afford foot room for the upper seat passengers below the heads of the lower seat passengers, and a longitudinal aisle from which either upper or lower seats may be reached by one or more steps, the headroom or clearance below the underside of the upper seats being greater than the height of the average passenger seated in the lower seats but less than the height of the average standing passenger when standing between said lower seats.

11. In a structure of the class described, a body having a plurality of compartments positioned on different levels, and a common corridor positioned above the floor level of the compartments at the lower level and below the floor level of the compartments at the higher level, steps permitting access from the corridor to the compartments at the lower level, and other steps permitting access from said corridor to the compartments at the higher level.

12. In a structure of the class described, a body having a plurality of compartments positioned on different levels, and a common corridor positioned above the floor level of the compartments at the lower level and below the floor level of the compartments at the higher level, steps permitting access from the corridor to the compartments at the lower level, other steps permitting access from said corridor to the compartments at the higher level, and seats in each of said compartments above and below the floor level of the corridor.

13. In a structure of the class described, a body having a plurality of passenger compartments positioned on different levels, the compartments on each level being positioned side by side and in staggered relation relative to those on the other level, the lower portions of the floor in the upper compartments being below the high ceiling levels of the lower compartments, seats in each of said compartments, and a common aisle for access to the compartments on the different levels, said aisle being positioned below the floor of the upper compartments and above the floor of the lower compartments.

ALBERT E. HUTT.

CERTIFICATE OF CORRECTION.

Patent No. 1,769,027.   Granted July 1, 1930, to

ALBERT E. HUTT.

It is hereby certified that error appears in the printed specification of the above numbered patent requiring correction as follows: Page 2, lines 104 and 105, claim 2, strike out the words "and in vertical alignment therewith" and insert the same to follow after the word "seats" in line 103; and that the said Letters Patent should be read with this correction therein that the same may conform to the record of the case in the Patent Office.

Signed and sealed this 2nd day of September, A. D. 1930.

(Seal)

M. J. Moore,
Acting Commissioner of Patents.

partments positioned on different levels, the compartments on each level being positioned side by side and in staggered relation relative to those on the other level, the lower portions of the floor in the upper compartments being below the high ceiling levels of the lower compartments, seats in each of said compartments, and a common aisle for access to the compartments on the different levels, said aisle being positioned below the floor of the upper compartments and above the floor of the lower compartments.

ALBERT E. HUTT.

CERTIFICATE OF CORRECTION.

Patent No. 1,769,027.   Granted July 1, 1930, to

ALBERT E. HUTT.

It is hereby certified that error appears in the printed specification of the above numbered patent requiring correction as follows: Page 2, lines 104 and 105, claim 2, strike out the words "and in vertical alignment therewith" and insert the same to follow after the word "seats" in line 103; and that the said Letters Patent should be read with this correction therein that the same may conform to the record of the case in the Patent Office.

Signed and sealed this 2nd day of September, A. D. 1930.

(Seal)

M. J. Moore,
Acting Commissioner of Patents.